United States Patent [19]

Talsma et al.

[11] 4,041,005

[45] Aug. 9, 1977

[54] IMPACT IMPROVEMENT OF RUBBER-MODIFIED NITRILE RESINS

[75] Inventors: Herbert Talsma, Cleveland Heights; William M. Giffen, Jr., Aurora, both of Ohio

[73] Assignee: The Standard Oil Company, Cleveland, Ohio

[21] Appl. No.: 649,222

[22] Filed: Jan. 15, 1976

[51] Int. Cl.$^2$ .......................... C08K 5/05; C08K 5/06; C08K 5/07

[52] U.S. Cl. .......................... 260/32.8 A; 260/33.2 R; 260/33.4 R; 260/879; 526/193

[58] Field of Search ................... 260/32.8 A, 33.2 R, 260/33.4 R, 879

[56] References Cited

U.S. PATENT DOCUMENTS

| | | | |
|---|---|---|---|
| 3,426,102 | 2/1969 | Solak et al. | 260/879 |
| 3,586,737 | 6/1971 | Duke et al. | 260/879 |
| 3,644,590 | 2/1972 | Coulthard | 260/894 |

*Primary Examiner*—Stanford M. Levin
*Attorney, Agent, or Firm*—John F. Jones; Sherman J. Kemmer

[57] ABSTRACT

The impact resistance of rubber-modified high-nitrile thermoplastic resins is greatly improved by including essential oils therein.

10 Claims, No Drawings

IMPACT IMPROVEMENT OF RUBBER-MODIFIED NITRILE RESINS

This invention relates to improved impact resistance in rubber-modified nitrile resins and more particularly pertains to the inclusion of certain naturally occurring oils, such as clove oil, eugenol, and the like, in rubber-modified high-nitrile thermoplastic resins for the purpose of improving the processability and impact resistance of said resins.

The naturally occurring oils most useful are commonly called essential oils. Some derivatives of the essential oils are also useful in the present invention. A more complete description of the essential oils and their derivatives appears in the Kirk-Othmer *Encyclopedia of Chemical Technology*, Second Edition, Volume 14, pages 178–216. Most preferred in the present invention are oils including clove oil, citral, eugenol, veratrole, citronellal, iso-safrol, cinnamyl alcohol, safrole, cineole, anisole, and the like. The oils are most useful when used in amounts within the range of from about 1% to 30% by weight based on the total weight of the oil and the rubber-modified high-nitrile resin.

The rubber-modified nitrile resins embodied herein are those which result from the polymerization of a major portion of an olefinically unsaturated nitrile, optionally another monomer component, and in the presence of a preformed rubber component by methods known to those skilled in the art.

The polymers which are most useful in the process of this invention include those produced by polymerizing a major proportion of a monounsaturated nitrile, such as acrylonitrile, and optionally a minor proportion of another monovinyl monomer component copolymerizable with said nitrile in an aqueous medium in the presence of a preformed diene rubber which may be a homopolymer or a copolymer of a conjugated diene monomer.

The esters of olefinically unsaturated carboxylic acids include those having the structure $$CH_2=C-COOR_2$$
$$|$$
$$R_1$$

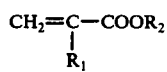

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene-1,3 and isoprene because of their ready availability and their excellent copolymerization properties.

The olefinically unsaturated nitriles useful in the present invention are the alpha, beta-olefinically unsaturated mononitriles having the structure $$CH_2=C-CN$$
$$|$$
$$R$$

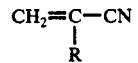

wherein R is hydrogen, a lower alkyl group having from 1 to 4 carbons atoms, or a halogen. Such compounds include acrylonitrile, alpha-chloroacrylonitrile, alpha-fluoro-acrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which is useful in this invention includes one or more of the esters of olefinically unsaturated carboxylic acids.

Polymerizates of particular utility in this invention and details of their method of preparation are described in U.S. Pat. Nos. 3,426,102 and 3,586,737, these references being incorporated herein in their entirety.

Specific polymerizates useful in the process of this invention include those prepared by the polymerization of 100 parts by weight of (A) at least 50% by weight of at least one nitrile having the structure $$CH_2=C-CN$$
$$|$$
$$R$$

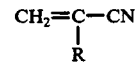

wherein R has the foregoing designation and (B) up to 50% by weight based on the combined weights of (A) and (B) of an ester having the structure $$CH_2=C-COOR_2$$
$$|$$
$$R_1$$

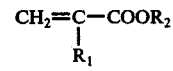

wherein $R_1$ and $R_2$ have the foregoing respective designations in the presence of from 1 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2=C-CN$$
$$|$$
$$R$$

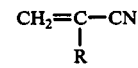

wherein R has the foregoing designation, and a monomer having the structure $$CH_2=C-COOR_2$$
$$|$$
$$R_1$$

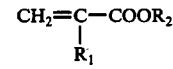

wherein $R_1$ and $R_2$ have the foregoing respective designations, said rubbery polymer containing from 50 to 100% by weight of polymerized conjugated diene and from 0 to 50% by weight of comonomer.

Preferably, component (A) should be present in from about 60 to 90% by weight based on the combined weights of (A) and (B) and the rubbery polymer (C) should contain more than 50% by weight of conjugated diene and more preferably from 60 to 90% by weight of the conjugated diene.

The polymerizates useful in the process of this invention can contain compounding ingredients and additives, pigments, colorants, stabilizers, etc., as well as known in the art, so long as the balance between impact strength, flexural strength, tensile strength, processability, heat- distortion temperature, and the like, is not affected to such a degree that the article is no longer useful for its intended purpose.

The polymers useful in the process of this invention are thermoplastic materials which are easily processed and can be thermoformed into a wide variety of useful articles in any of the conventional ways employed with well known thermoplastic polymeric materials such as by extrusion, milling, molding, drawing, blowing, etc. The polymers resulting from the process of this invention have excellent solvent resistance, including water-frost resistance, and their impact strength (when rubber modified) and low permeability to gases and vapors make them very useful in the packaging industry, and they are particularly useful in the manufacture of bottles, films, envelopes, boxes, and other types of containers for liquids and solids.

In the following examples, which will further illustrate this invention, the amounts of the various ingredients are given in parts by weight unless otherwise specified.

EXAMPLE 1

A. A rubber latex was prepared by polymerizing with continuous agitation at 45° C in the substantial absence of oxygen a mixture of the following ingredients:

| Ingredient | arts |
|---|---|
| acrylonitrile | 30 |
| butadiene-1,3 | 60 |
| emulsifier (Gafac RE-610)* | 2.4 |
| azobisisobutyronitrile | 0.3 |
| t-dodecyl mercaptan | 0.5 |
| water | 200 |

*A mixture of $R-O-(CH_2CH_2O-)_nPO_3M_2$ and $[R-O-(CH_2CH_2O-)_n]_2PO_2M$ wherein n is a number from 1 to 40, R is an alkyl or alkaryl group and preferably a nonyl phenyl group, and M is hydrogen, ammonia or an alkali metal, which composition is sold by GAF Corporation.

Before reaction was started, the pH of the mixture was adjusted to about 8 with KOH. The polymerization was carried out for 22 and 1/2 hours to a conversion of about 92% and a total solids of about 33.1%.

B. An impact-resistant, gas barrier resin was prepared by polymerization of a mixture of the following ingredients:

| Ingredient | Parts |
|---|---|
| acrylonitrile | 75 |
| methyl acrylate | 25 |
| rubber solids in the form of latex A (above) | 9 |
| potassium persulfate | 0.06 |
| emulsifier (Gafac RE-610) | 3 |
| modifier (n-dodecyl mercaptan) | 1 |
| ethylene diamine tetra acetic acid | 0.05 |
| water | 200 |

The pH was adjusted to about 7 with $NH_4OH$. The polymerization was carried out in the substantial absence of oxygen at 60° C for 5 hours so as to produce a conversion of 91% of a latex. The latex obtained from the polymerization was then coagulated and the resin was dried and compression molded into a bar at 150° C. The molded bar was transparent and found to have a notched Izod impact strength of 1.2 foot pounds per inch of notch and ASTM heat-distortion temperatures of 69° C at 264 psi and 75° C at 66 psi by ASTM test D-648-56. The polymer was easily blended in a Brabender plasticorder and at the end of 10 minutes in the plasticorder at 230° C and 35 rpm, a torque reading of 1150 meter grams was obtained for the polymer. A sample of this polymer was compression molded into a sheet and this sheet was found to have a water vapor transmission of 4.51 grams/mil/100 inches$^2$/24 hours at 90% relative humidity and 100° F by ASTM procedure E-96. The sheet was found to have an oxygen transmission of 0.6 cc/mil/100 inches$^2$/24 hours/atmosphere by ASTM procedure D-1434. The sheet was also found to have a frosting index of 6.4 haze units. Frosting index was obtained by measuring the haze or refracted light off the piece of the sheet. The sheet was then subjected to a temperature of 50° C and 100% relative humidity for 16 hours at which time the haze was redetermined. The difference in the haze readings is the frost index. The haze readings were done on a Hunter Laboratories color difference meter model D-25-P.

EXAMPLE 2

Samples of the resin described in Example 1 were blended with various amounts of clove oil in an efficient mixer such as rubber mill, Banbury, extruder or ko-kneader. The blends were compression molded into test bars and the notched Izod impact values were determined on the bars including a control bar containing no clove oil. The following results were obtained:

| Clove Oil % | Notched Izod Impact Strength |
|---|---|
| 0 | 1.2 foot pounds per inch of notch |
| 5 | 2.2 foot pounds per inch of notch |
| 10 | 3.6 foot pounds per inch of notch |
| 20 | 2.8 foot pounds per inch of notch |

EXAMPLE 3

The procedure of Example 2 was repeated using 10% of eugenol in place of 10% of clove oil with the following results:

| Eugenol, % | Notched Izod Impact Strength |
|---|---|
| 0 | 1.2 foot pounds per inch of notch |
| 10 | 3.4 foot pounds per inch of notch |

EXAMPLE 4

The procedure of Example 3 was repeated using citral in place of eugenol. The notched Izod impact for the citral-containing resin was 5.1 foot pounds per inch of notch compared to 1.2 foot pounds per inch of notch for the control.

EXAMPLE 5

The procedure of Example 4 was repeated using veratrole in place of citral. The notched Izod impact strength for the veratrole-containing resin was 2.1 foot pounds per inch of notch compared to 1.2 foot pounds per inch of notch for the control.

EXAMPLE 6

The procedure of Example 5 was repeated using citronellal in place of veratrole. The notched Izod impact strength for the citronellal-containing resin was 2.8 foot pounds per inch of notch compared to 1.2 foot pounds per inch of notch for the control.

EXAMPLE 7

The procedure of Example 6 was repeated using cinnamyl alcohol in place of citronellal. The notched Izod impact strength for the cinnamyl alcohol-containing resin was 2.1 foot pounds per inch of notch compared to 1.2 foot pounds per inch of notch for the control.

EXAMPLE 8

The procedure of Example 7 was repeated using iso-safrol instead of cinnamyl alcohol. The notched Izod impact strength for the iso-safrol-containing resin was 1.9 foot pounds per inch of notch compared to 1.2 foot pounds per inch of notch for the control.

EXAMPLE 9

The procedure of Example 8 was repeated using iso-eugenol instead of iso-safrol. The notched Izod impact strength for the iso-eugenol-containing resin was 2.1 foot pounds per inch of notched compared to 1.2 foot pounds per inch of notch for the control.

EXAMPLE 10

The procedure of Example 9 was repeated using trans cinnamaldehyde instead of iso-eugenol. The notched Izod impact strength for the trans cinnamaldehyde-containing resin was 1.6 foot pounds per inch of notch compared to 1.2 foot pounds per inch of notch for the control.

EXAMPLE 11

The procedure of Example 10 was repeated using safrole instead of trans cinnamaldehyde. The notched Izod impact strength for the safrole-containing resin was 1.6 foot pounds per inch of notch compared to 1.2 foot pounds per inch of notch for the control.

EXAMPLE 12

The procedure of Example 11 was repeated using 4 parts of cineole instead of 10 parts of safrole. The notched Izod impact strength for the cineole-containing resin was 2.3 foot pounds per inch of notch compared to 1.2 foot pounds per inch of notch for the control.

EXAMPLE 13

The procedure of Example 11 was repeated using 8 parts of anisole instead of 10 parts of safrole. The notched Izod impact strength for the anisole-containing resin was 2.9 foot pounds per inch of notch compared to 1.2 foot pounds per inch of notch for the control.

We claim:

1. An impact-resistant resin composition comprising an intimate mixture of from 1 to 30 parts by weight of an essential oil and 100 parts by weight of a resin resulting from the polymerization of a major proportion of an unsaturated nitrile in the presence of a preformed rubber component and optionally a minor proportion of at least one other polymerizable component.

2. The composition of claim 1 wherein the resin is one which results from the polymerization of 100 parts by weight of A. at least 50% by weight of at least one nitrile having the structure $$CH_2=C-CN$$
$$|$$
$$R$$

wherein R is hydrogen, a lower alkyl group having from 1 to 4 carbon atoms, or a halogen, and B. up to 50% by weight based on the combined weights of (A) and (B) of an ester having the structure $$CH_2=C-COOR_2$$
$$|$$
$$R_1$$

wherein $R_1$ is hydrogen, an alkyl group having from 1 to 4 carbon atoms, or a halogen, and $R_2$ is an alkyl group having from 1 to 6 carbon atoms in the presence of from 1 to 40 parts by weight of C. a rubbery polymer of a conjugated diene monomer selected from the group consisting of butadiene and isoprene and optionally a comonomer selected from the group consisting of styrene, a nitrile monomer having the structure $$CH_2=C-CN$$
$$|$$
$$R$$

wherein R has the foregoing designation and a monomer having the structure $$CH_2=C-COOR_2$$
$$|$$
$$R_1$$

wherein $R_1$ and $R_2$ have the foregoing respective designations, said rubbery polymer containing from 50 to 100% by weight of polymerized conjugated diene and from 0 to 50% by weight of comonomer.

3. The composition of claim 2 wherein (A) is acrylonitrile.

4. The composition of claim 3 wherein the oil is clove oil.

5. The composition of claim 3 wherein the oil is eugenol.

6. The composition of claim 3 wherein the oil is citral.

7. The composition of claim 3 wherein the oil is veratrole.

8. The composition of claim 3 wherein the oil is cinnamyl alcohol.

9. The composition of claim 3 wherein the oil is iso-safrol.

10. The composition of claim 3 wherein the oil is cineole.

* * * * *